(12) United States Patent
Toskala et al.

(10) Patent No.: US 6,359,865 B1
(45) Date of Patent: Mar. 19, 2002

(54) METHOD OF IMPLEMENTING MACRODIVERSITY

(75) Inventors: Antti Toskala; Risto Wichman, both of Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/520,387

(22) Filed: Mar. 8, 2000

Related U.S. Application Data

(63) Continuation of application No. PCT/FI98/00702, filed on Sep. 9, 1998.

(30) Foreign Application Priority Data

Sep. 10, 1997 (FI) .................................................. 973652

(51) Int. Cl.$^7$ .............................................. H04Q 7/00
(52) U.S. Cl. ...................................... 370/329; 370/537
(58) Field of Search ................................ 370/203, 204, 370/206, 208, 310, 311, 320, 328, 331–3, 335, 342, 441, 532, 533, 535, 537

(56) References Cited

U.S. PATENT DOCUMENTS

| | | |
|---|---|---|
| 5,377,183 A | 12/1994 | Dent |
| 5,418,785 A * | 5/1995 | Olshansky et al. ......... 370/438 |
| 5,577,047 A | 11/1996 | Persson et al. |
| 5,583,913 A | 12/1996 | Taketsugu |
| 5,621,723 A | 4/1997 | Walton, Jr. et al. |
| 5,828,659 A | 10/1998 | Teder et al. |
| 6,173,005 B1 * | 1/2001 | Kotzin et al. ............... 375/141 |

FOREIGN PATENT DOCUMENTS

| | | |
|---|---|---|
| WO | WO 94/30024 | 12/1994 |
| WO | WO 95/08901 | 3/1995 |

OTHER PUBLICATIONS

F. Adachi, M. Sawahashi and K. Okawa; "Tree–structured generation of orthogonal spreading codes with different lengths for forward link of DS–CDMA mobile radio", Electronics Letters, Jan. 2, 1997, vol. 33, No. 1, pp. 27–28.
International Search Report for PCT/FI98/00702.

* cited by examiner

*Primary Examiner*—David R. Vincent
(74) *Attorney, Agent, or Firm*—Altera Law Group, LLC

(57) ABSTRACT

The invention relates to a method of implementing macrodiversity in a cellular radio network having in each cell at least one base station which communicates with subscriber terminals within its area. Packet switched connections are provided between the base station and the terminals, the connections comprising an actual traffic channel and a separate control channel. In signal transmission, the terminals use IQ modulation in which the traffic and control channels are multiplexed to be transmitted on different branches, and the terminals can communicate with more than one base station simultaneously. To enable macrodiversity in packet switched connections, the actual traffic channel connection is also maintained between the terminal and only one base station, and the control channel connection is maintained between the terminal and more than one base station simultaneously.

12 Claims, 3 Drawing Sheets

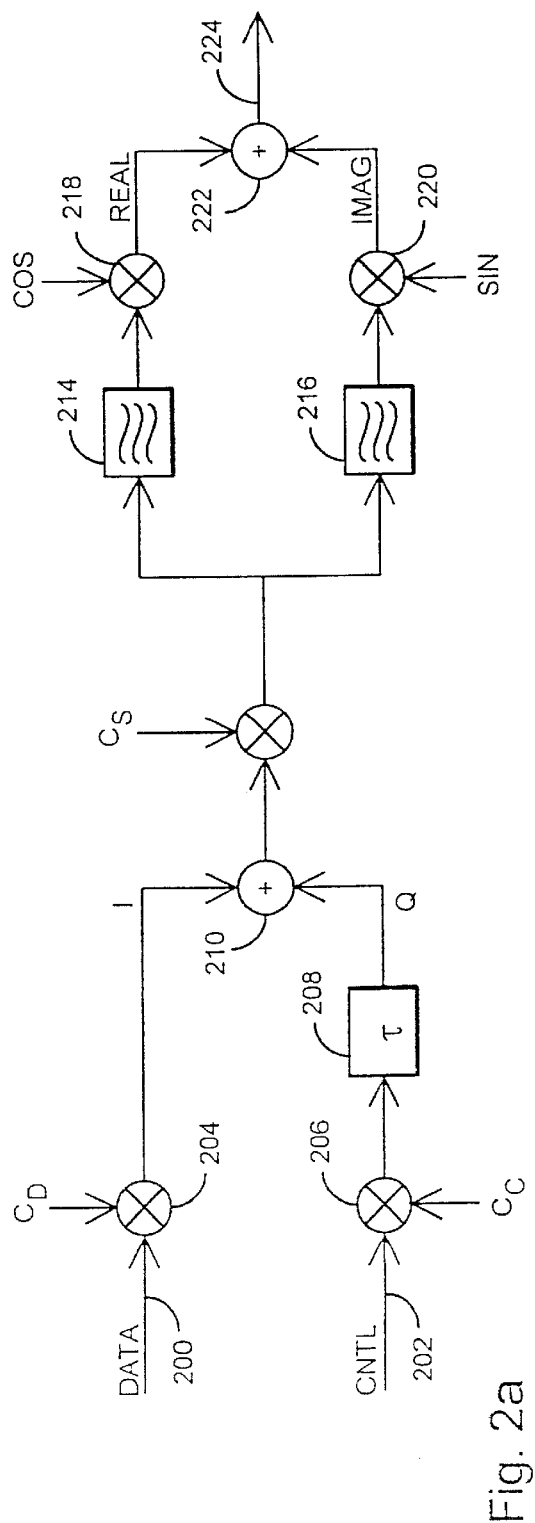
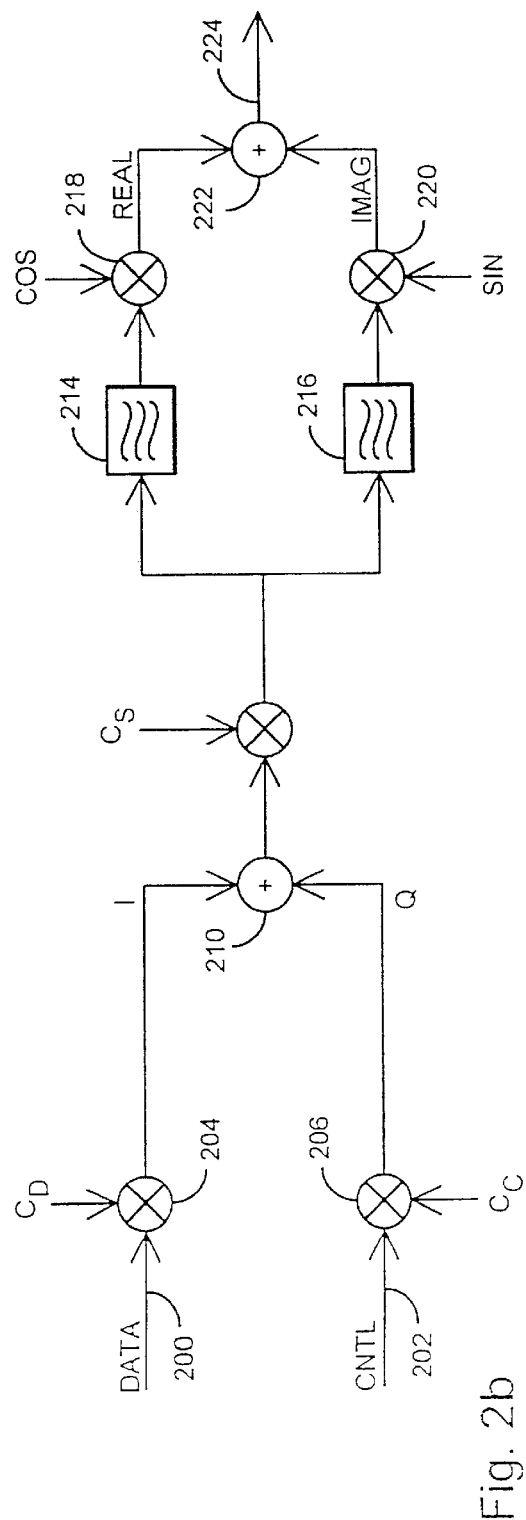
Fig. 2a
Fig. 2b

METHOD OF IMPLEMENTING MACRODIVERSITY

This application is a con of PCT/FI98/00702 filed Sep. 9, 1998.

FIELD OF THE INVENTION

The invention relates to a method of implementing macrodiversity in a cellular radio network having in each cell at least one base station which communicates with subscriber terminals within its area, and in which method packet switched connections are provided between the base station and the terminals, the connections comprising an actual traffic channel and a separate control channel, and that in signal transmission, the terminals use IQ modulation in which the traffic and control channels are multiplexed to be transmitted on different branches, and the terminals can communicate with more than one base station simultaneously.

BACKGROUND OF THE INVENTION

The present invention is suitable for use particularly in a cellular radio system utilizing code division multiple access. CDMA is a multiple access method based on the spread spectrum technique, and it has recently been applied to cellular radio systems, in addition to the prior FDMA and TDMA methods.

In a typical mobile telephone environment, signals between a base station and a mobile station propagate between a transmitter and a receiver over several paths. This multipath propagation is mainly caused by the reflections of the signal from the surrounding surfaces. The signals having propagated over different paths reach the receiver at different times because of a different propagation delay. In CDMA, the multipath propagation can be utilized in signal reception in the same manner as diversity. The autocorrelation properties of the spreading codes used in transmissions enable the separation of different delay components from one another. A widely used CDMA receiver solution is a multi-branch rake receiver structure in which each different branch is synchronized with a signal component having propagated over a different path. A digital receiver unit is composed of a number of rake branches, and each branch is an independent receiver element whose task is, in other words, to despread and demodulate one received signal component. The CDMA receiver advantageously combines the signals of different digital receiver unit elements, whereupon a signal of good quality is obtained.

In CDMA systems, it is also possible to apply soft handover in which the mobile station can communicate simultaneously with several base stations. This is also referred to as macrodiversity. Consequently, the connection quality of the mobile station during handover remains high, and the user does not notice a break in the connection. In the conventional macrodiversity, two or more base stations transmit the same signal in the downlink transmission direction (from base station to terminal). Since the base stations use the same frequency, the terminal may receive simultaneously from more than one transmitter. The signals from different base stations are separated in the same manner as the delay components by means of different rake branches. In the uplink transmission direction (from terminal to base station), two or more base stations receive the same signal transmitted by the terminal. The signals are combined at a first common point on a signal path. The macrodiversity enables optimal power control, which minimizes the interference level of the network and, consequently, maximizes the network capacity.

Circuit switching is a method in which a connection is set up between users by allocating the connection a predetermined amount of transmission capacity. The transmission capacity is allocated solely to said connection for the duration of the entire connection. Known mobile telephone systems, for example the GSM-based GSM 900/DCS 1800/PCS 1900 systems and the United States IS 95 radio system using the CDMA technique, are therefore based on circuit switching.

Packet switching is a method in which a connection is set up between users by transmitting data in the form of packets that include address and control information, in addition to actual information. Several connections can use the same data link simultaneously. An ARQ protocol is often used in connection with packet protocols. The ARQ protocol (Automatic Repeat Request) refers to a procedure which attempts to improve the reliability of the data to be transmitted by retransmitting the information that is transmitted. In accordance with the protocol, the receiver transmits a data repeat request to the sender if the receiver considers the received data unreliable. The unreliability of the data is detected by checking a check sum from the received packet, for example.

The use of packet switched radio systems particularly for data transmission has been a subject of research in recent years, since the packet switching method is well suitable for data transmission where data to be transmitted is generated in bursts, required by the use of interactive software, for example. In that case, it is not necessary to reserve a data link for the duration of the entire connection, but only for the duration of packet transmission. This provides a considerable saving on cost and capacity during both the construction stage and the operating stage of the network.

When packet switched connections are applied to the CDMA systems, implementing the macrodiversity has been problematic. In the packet switched connections, traffic is not continuous but occurs in bursts. In the conventional macrodiversity, particularly in the transmission direction from the base station to the terminal, the transmission from several base stations generates much interference and it is difficult to control the retransmission of the packets between several base stations. Consequently, the packet switched connections are implemented in prior art solutions without macrodiversity. Since the macrodiversity is not used, all handovers must be implemented as so-called hard handovers in which the connection to the old base station is broken before a connection is set up to a new base station. This has brought about problems particularly in the selection of the new base station and in power control particularly at the borders of the coverage areas.

BRIEF DESCRIPTION OF THE INVENTION

An object of the invention is to provide a method to solve the above-described problems. This is achieved by a method of the type presented in the introduction, which is characterized by maintaining the actual traffic channel connection between the terminal and only one base station, and by maintaining a control channel connection simultaneously between the terminal and more than one base station.

The method of the invention provides many advantages. The invention enables optimal power control and ensures that the packet traffic can always be allocated the best connection at a given time. Furthermore, interference caused by the packet traffic is reduced in the system, since less traffic occurs in the transmission direction from the base station to the terminals. The automatic repeat request ARQ protocol can also be explicitly implemented. Furthermore, handover to the packet channel connection can be implemented rapidly and reliably, since the control channel connection provides links to the base stations.

BRIEF DESCRIPTION OF THE DRAWINGS

In the following, the invention will be described in more detail by means of preferred embodiments with reference to the accompanying drawings, in which:

FIGS. 2a and 2b illustrate the implementation of a terminal transmission.

DETAILED DESCRIPTION OF THE INVENTION

Figure 1:
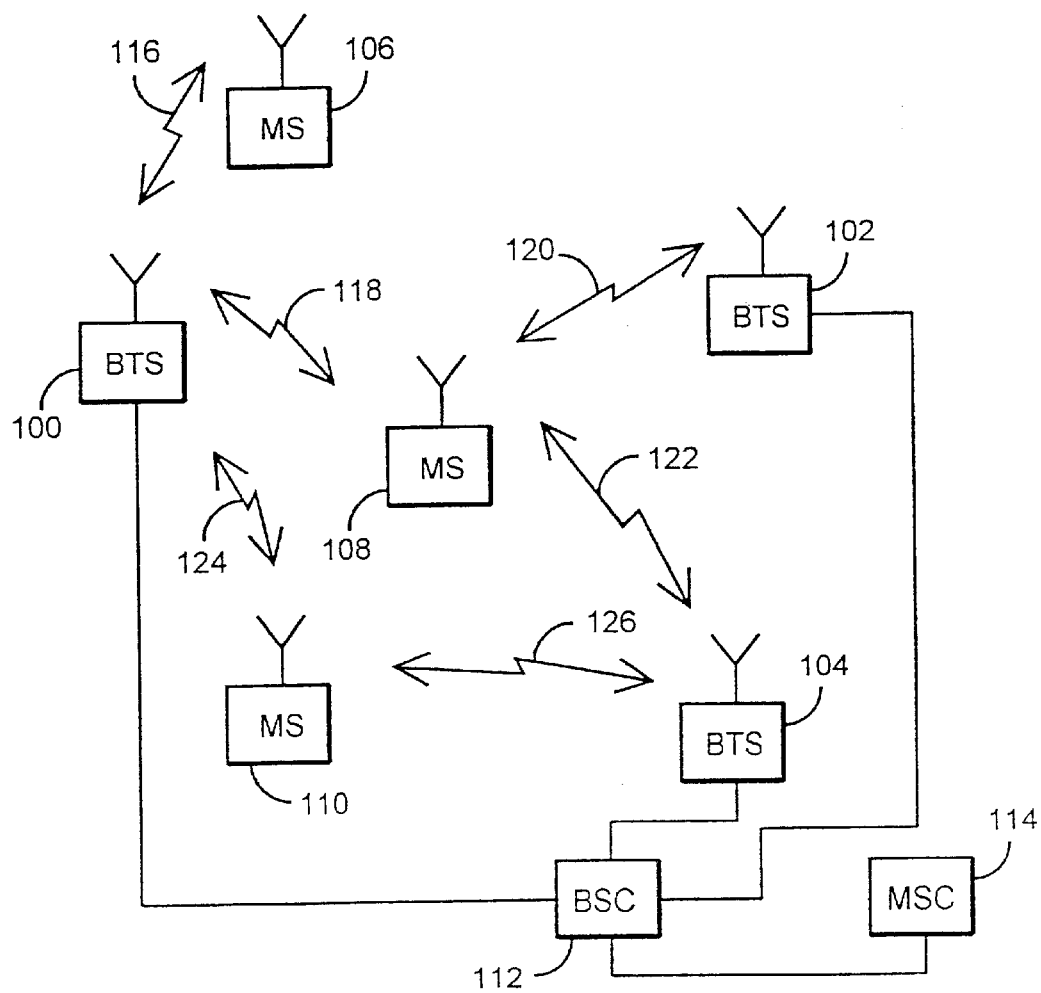
FIG. 1 shows a cellular radio system to which the solution of the invention can be applied.

Let us first study FIG. 1 illustrating a cellular radio system in which the method of the invention can be used. The radio system comprises base stations 100 to 104 communicating with subscriber terminals 106 to 110. A base station controller 112 controls the operation of one or more base stations. In radio systems, user speech and data traffic is transmitted between a base station and a subscriber terminal by using traffic and control channels. The base station controller 112 transmits traffic to a mobile services switching centre 114 through which the traffic is forwarded to a fixed network or to other parts of the radio system.

In the situation presented in the figure, the terminal 106 has a connection 116 with the base station 100 without utilizing macrodiversity. The terminal 108 has a macrodiversity connection 118 to 122 with the three base stations 100, 102 and 104. The terminal 110 has a macrodiversity connection 124, 126 with the two base stations 100 and 104.

The terminal and the base station communicate with one another by using traffic and control channels. The traffic channel is used for transmitting payload information, such as speech or data, of the actual call. The control channel is used for transmitting information associated with call maintenance, such as power control commands and power control measurement results. In multi-rate data systems, the control channel is used for transmitting information about a transmission rate required on the traffic channel.

In the cellular radio system to which the method of the invention can be advantageously applied, the traffic channel uses a packet-form protocol. In signal transmission, the terminals use IQ modulation in which the traffic and control channels are multiplexed to be transmitted on different branches. Let us next study FIG. 2a illustrating the transmission of traffic channel and control channel signals of the terminal. In the example of FIG. 2a, traffic channel information is transmitted on the I branch and control channel information is transmitted on the Q branch. Traffic channel information 200 to be transmitted is applied to a multiplier 204 multiplying the information by a channelization spreading code $C_D$. Correspondingly, control channel information 202 is applied to a second multiplier 206 multiplying the information by a channelization spreading code $C_C$. When offset modulation is used, the multiplied control channel signal is further applied to delay means 208 typically delaying the signal for the duration of half a chip, i.e. for the duration of a spreading code bit. The channelization spreading codes $C_D$ and $C_C$ differ from one another. The signals so multiplied are combined in an adder 210, whereby a combined complex signal in the form of I+jQ is obtained.

The complex I+jQ signal is applied to a third multiplier 212 multiplying the signal by a scrambling spreading code $C_S$ being typically a short spreading code. The channelization and scrambling spreading codes can be preferably selected by means of the orthogonal variable spreading factor technique described, for example, in the publication Adachi, F., Sawahashi, M., Okawa, K., "Tree-structured generation of orthogonal spreading codes with different lengths for forward link of DS-CDMA mobile", Electronics Letters, Vol. 33, No. 1, pp. 27–28. In each terminal, the scrambling spreading codes differ from one another within a particular cell. The signal is branched from the multiplier 212 and applied via filters 214 and 216 to multipliers 218 and 220 multiplying the signals by carrier-frequency cosine and sine functions. The modulated real and imaginary signals so obtained are combined in an adder 222 and further applied to the other parts of the transmitter, via an amplifier to an antenna, for example (not shown in the figure). The details of the terminal may vary from the solution described above, as it is obvious to those skilled in the art. The above description only illustrates a feasible implementation of the IQ modulation.

FIG. 2b illustrates an example similar to that presented in FIG. 2a except that the offset modulation is not used. In that case the terminal does not comprise the delay means 208. In other respects, the structure of the device is as described above.

In the macrodiversity solution of the invention, the actual traffic channel connection, which is, in other words, the packet switched connection, is maintained between the terminal and only one base station, and the control channel connection is maintained simultaneously between the terminal and more than one base station. However, the terminal transmits only one signal in which the traffic channel and control channel information are separated onto the I and Q branches, as described above. Each base station communicating with the terminal receives the same signal but, in the solution of the invention, processes the received signal in different manners.

Let us again study FIG. 1. Let us assume that in the situation presented in the figure the terminal 110 has the macrodiversity connection with the two base stations 100 and 104. Furthermore, let us assume that the base station 100 maintains a traffic channel connection to the terminal 110. The base station 104 has only a control channel connection with the terminal 110.

According to a preferred embodiment of the invention, the base station having the traffic channel connection with the terminal, i.e. the base station 100 in the example of FIG. 1, receives a signal 124 from the terminal and demodulates the traffic channel and control channel signals. In the base station, error correction is performed to traffic channel packets, and, also in that case, the base station is responsible for generating a retransmission request of the erroneous packets to the terminal. The base station 100 forwards the decoded traffic channel packets to the other parts of the network.

Figure 3A:
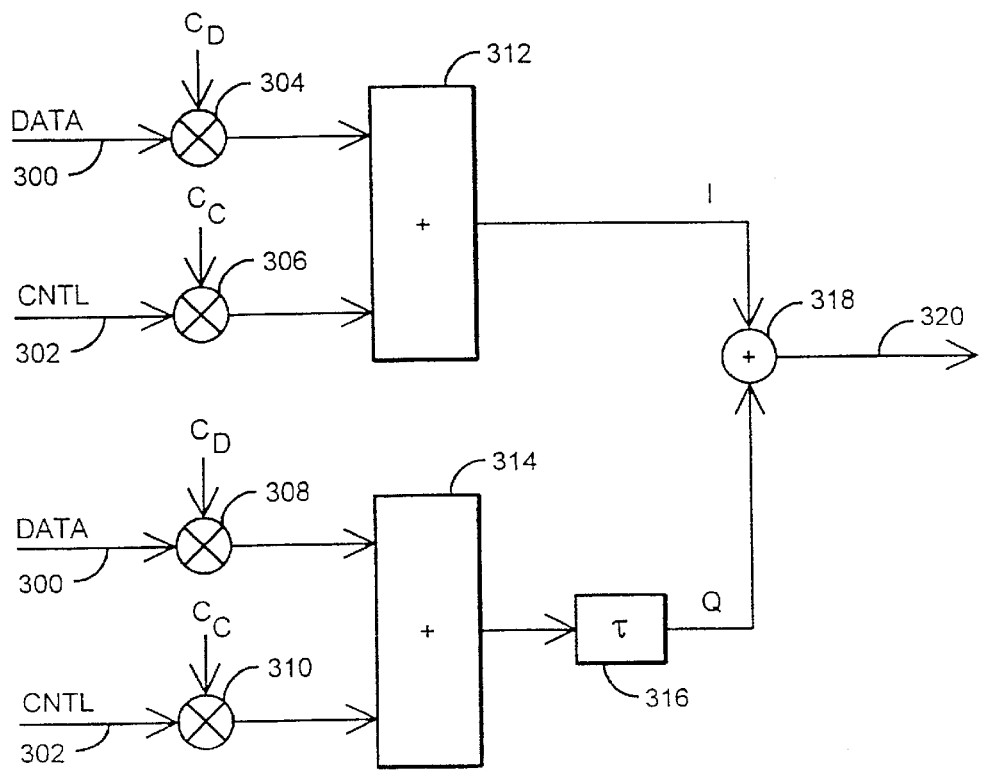
FIGS. 3a and 3b illustrate the implementation of a base station transmission.

In the reverse transmission direction, the base station 100 transmits the traffic channel and control channel information to the terminal 110. Let us next study FIG. 3a illustrating the transmission of traffic channel and control channel signals of the base station 100. In the base station 100, conventional IQ modulation is performed to the traffic and control channels.

Traffic channel information 300 to be transmitted on the I branch is applied to a multiplier 304 multiplying the information by the channelization spreading code $C_D$. Correspondingly, control channel information 302 is applied to a second multiplier 306 multiplying the information by the channelization spreading code $C_c$. The signals so obtained are applied to a first adder 312 combining the signals. The traffic channel information 300 to be transmitted on the Q branch is applied to a multiplier 308 multiplying the information by the channelization spreading code $C_D$. Correspondingly, the control channel information 302 is applied to a second multiplier 310 multiplying the information by the channelization spreading code $C_C$. The signals so obtained are applied to a second adder 314 combining the signals. The summed Q-branch signal is further applied to delay means 310 typically delaying the signal for the duration of half a chip, i.e. for the duration of a spreading code bit. In other words, offset modulation is involved. The I- and Q-branch signals are applied to a third adder 318 combining the signals, whereby a complex signal 320 of the form I+jQ is obtained and forwarded to be multiplied by a scrambling spreading code and modulated as described in FIG. 2. The scrambling spreading code is the same for all the users. As in the above case, the channelization spreading codes $C_D$ and $C_C$ differ from one another. The codes of different users also differ from one another.

Figure 3B:
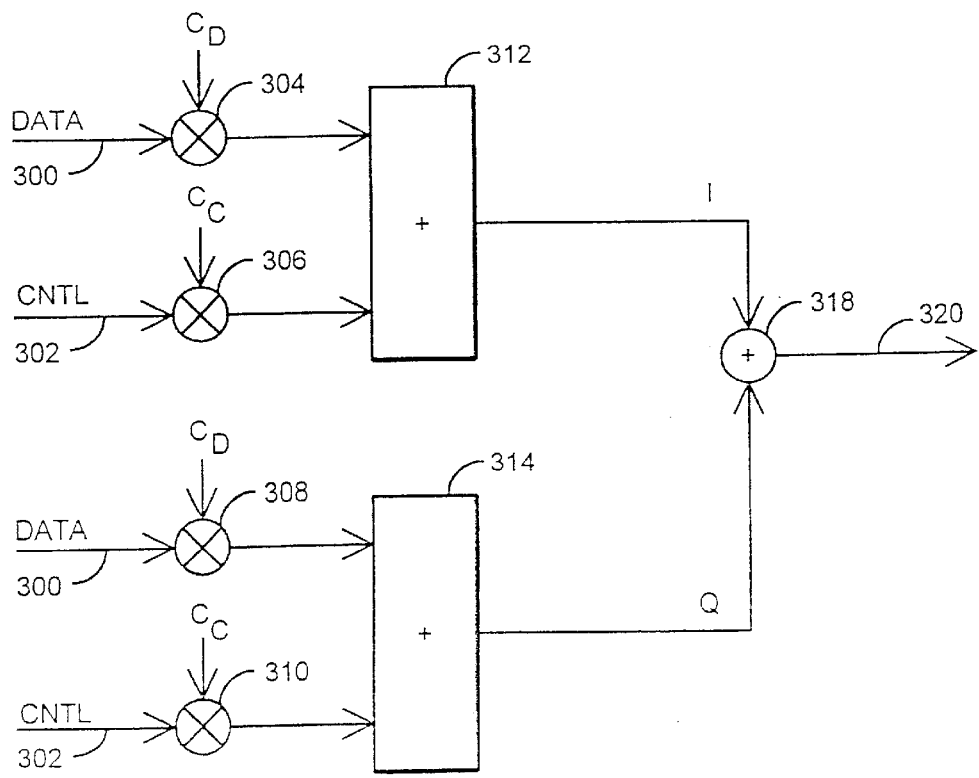

FIG. 3b illustrates an example similar to the one described in FIG. 3a except that the offset modulation is not used. In that case the signal obtained from the second adder 314 is directly applied to the third adder 318 without applying the signal to the delay means therebetween. This embodiment can be implemented slightly more advantageously than the solution of FIG. 3a.

According to a preferred embodiment of the invention, the base station having the control channel connection with the terminal, i.e. the base station 104 in the example of FIG. 1, receives a signal 126 from the terminal, the signal comprising the traffic channel and control channel signals, but the base station 104 demodulates only the control channel signal and does not demodulate the traffic channel information. Power control is performed solely on the basis of the control channel information. In the reverse transmission direction, the base station transmits only the control channel signal. The modulation is performed as described in connection with FIG. 3 except that the data signal does not exist.

According to a second preferred embodiment of the invention, the base station having the control channel connection with the terminal, i.e. the base station 104 in the example of FIG. 1, receives the traffic channel and control channel signals but demodulates both the traffic channel and the control channel signal. Power control is performed solely on the basis of the control channel information. The base station detects the correctness of the packets from the traffic channel information, but does not forward the packets to the other parts of the network. Only the number of erroneous packets is reported either to the terminal or, via a base station switching centre, to the network. In the reverse transmission direction, the base station transmits only the control channel signal. The modulation is performed as described in FIG. 3 except that the data signal does not exist.

According to a third preferred embodiment of the invention, the base station having the control channel connection with the terminal, i.e. the base station 104 in the example of FIG. 1, receives the traffic channel and control channel signals, but demodulates both the traffic channel and the control channel signal. Power control is performed only on the basis of the control channel information. The base station checks the correctness of the packets from the traffic channel information, and stores the packets for a predetermined time, but does not forward the packets automatically to the other parts of the network. Only the number of erroneous packets is reported either to the terminal or, via a base station switching centre, to the network. If the network transmits a request, the base station transmits packets to a base station controller provided that the request arrives within the storage time. In the reverse transmission direction, the base station transmits only the control channel signal. The modulation is performed as described in FIG. 3 except that the data signal does not exist.

Referring to FIG. 1, the terminal 104 then receives a signal from the two base stations 100 and 104. The signal of the base station 100 comprises the traffic channel and control channel signals, but the signal of the base station 104 comprises only the control channel signal Since the terminal has the control channel connection with the base station 104, it can perform rapid traffic channel handover from the base station 100 to the base station 104, if required. Handover can be performed rapidly, since the base station 104 does not need to synchronize with the terminal transmission and to search the spreading codes, since the control channel connection has already enabled the execution of these operations.

For discontinuous transmission, for example, the described IQ multiplexing is particularly advantageous for the transmission of the terminal. In the base station transmission, the pulsing of the discontinuous transmission is not important, since the base station transmission also comprises other channels, and therefore has a continuous envelope. In the solution of the invention, the base station transmission can also apply the conventional QPSK modulation in which the control channel information and the traffic channel information are, as distinguished from the terminal transmission, time-multiplexed to one QPSK signal. When the control connection is involved, the other base stations then transmit only the control symbol and not the data symbol in transmission, whereas the base station having both the traffic connection and the control connection transmits the complete signal. In an alternative implementation of the control connection, the base stations transmit the control symbols to the terminal in the normal manner, but the traffic channel symbols are transmitted at a substantially lower power level.

Although the invention is described above with reference to the example according to the accompanying drawings, it is obvious that the invention is not restricted thereto, but it can be modified in many ways within the scope of the inventive idea disclosed in the attached claims.

What is claimed is:

1. A method of implementing macrodiversity in a cellular radio network having in each cell at least one base station which communicates with subscriber terminals within the at least one base station's area, the method comprising:

providing packet switched connections between the base station and the terminals, the connections comprising an actual traffic channel and a separate control channel, and in signal transmission, the terminals use IQ modulation in which the traffic and control channels are multiplexed to be transmitted on different branches, and the terminals can simultaneously communicate with more than one base station, and maintaining the actual traffic channel connection between the terminal and only one base station, and simultaneously maintaining a control channel connection between the terminal and more than one base station.

2. The method as claimed in claim 1, wherein measurements are performed to the control channel connections, and that the base station communicating with the terminal on the traffic channel is selected on the basis of the measurement results of the control channel connections.

3. The method as claimed in claim 1, wherein the traffic and control channels are multiplexed in the terminal in that the traffic channel is transmitted on the I branch and the control channel is transmitted on the Q branch.

4. The method as claimed in claim 3, wherein both the traffic channel and the control channel are first multiplied by a specific channelization spreading code, after which control channel information is converted into complex form, and that the traffic channel information and the control channel information are combined, and that the combined signal is multiplied by a common spreading code.

5. The method as claimed in claim 1, wherein the base station having the traffic channel connection with the terminal receives and demodulates the traffic channel and control channel signals, performs error correction to traffic channel packets, forwards the received traffic channel packets to other parts of the network and is responsible for generating a retransmission request of erroneous packets.

6. The method as claimed in claim 1, wherein the base station having the traffic channel connection with the terminal transmits both the traffic channel packets and the control channel signal to the terminal.

7. The method as claimed in claim 1, wherein the base station having the control channel connection with the terminal receives the traffic channel and control channel signals, and demodulates only the control channel signal.

8. The method as claimed in claim 1, wherein the base station having the control channel connection with the terminal receives and demodulates the traffic channel and control channel signals, counts the number of erroneous packets and forwards the information about the erroneous packets to the other parts of the network.

9. The method as claimed in claim 8, wherein the base station having the control channel connection with the terminal stores the received packets for a predetermined time and forwards the packets to the other parts of the network if the network sends a transmission request.

10. The method as claimed in claim 1, wherein the base station having the control channel connection with the terminal transmits only the control channel signal to the terminal.

11. The method as claimed in claim 1, wherein the base station having the traffic connection with the terminal transmits the traffic channel and control channel signals multiplexed on the same channel, and that the base stations having the control channel connection with the terminal transmit only the control channel signal to the terminal and pause the transmission by the traffic channel symbols.

12. The method as claimed in claim 1, wherein the base station having the traffic connection with the terminal transmits the traffic channel and control channel signals multiplexed on the same channel, and that the base stations having the control channel connection with the terminal transmit the control channel signal to the terminal and transmit the traffic channel symbols at a substantially lower power level.

* * * * *